(12) United States Patent
Meier (10) Patent No.: US 8,128,277 B2
(45) Date of Patent: Mar. 6, 2012

(54) MAGNETIC AGITATOR

(75) Inventor: Hans Peter Meier, Wangen (CH)

(73) Assignee: Zeta Biopharma GmbH, Tobelbad (AT)

( * ) Notice: Subject to any disclaimer, the term of this patent is extended or adjusted under 35 U.S.C. 154(b) by 1180 days.

(21) Appl. No.: 11/495,141

(22) Filed: Jul. 28, 2006

(65) Prior Publication Data

US 2007/0036027 A1 Feb. 15, 2007

(30) Foreign Application Priority Data

Jul. 29, 2005 (CH) ........................................ 1303/05

(51) Int. Cl.
*B01F 13/08* (2006.01)
(52) U.S. Cl. ........................................................ 366/273
(58) Field of Classification Search .......... 366/273–274, 366/197–205, 207, 314, 331, 349; 416/3; 435/302.1; 464/29; 403/DIG. 1
See application file for complete search history.

(56) References Cited

U.S. PATENT DOCUMENTS

| | | | | |
|---|---|---|---|---|
| 1,420,773 | A * | 6/1922 | Stainbrook | 366/274 |
| 4,993,841 | A * | 2/1991 | Lofgren et al. | 366/274 |
| 5,061,079 | A | 10/1991 | Shiobara | |
| 5,141,327 | A * | 8/1992 | Shiobara | 366/274 |
| 5,217,302 | A * | 6/1993 | Jin-ping | 366/79 |
| 5,249,957 | A * | 10/1993 | Hirata | 431/354 |
| 5,393,142 | A * | 2/1995 | Meier | 366/274 |
| 5,399,074 | A * | 3/1995 | Nose et al. | 417/423.1 |
| 5,407,272 | A * | 4/1995 | Meier | 366/274 |
| 6,065,865 | A * | 5/2000 | Eyraud et al. | 366/273 |
| 6,206,562 | B1 * | 3/2001 | Eyraud et al. | 366/273 |
| 6,443,715 | B1 * | 9/2002 | Mayleben et al. | 417/423.1 |
| 6,854,877 | B2 * | 2/2005 | Hoobyar et al. | 366/274 |
| 6,881,033 | B2 * | 4/2005 | Makinson et al. | 416/3 |
| 7,481,572 | B2 * | 1/2009 | Terentiev | 366/279 |
| 2002/0181323 | A1 * | 12/2002 | Stogsdill | 366/273 |
| 2004/0062648 | A1 * | 4/2004 | Makinson et al. | 416/3 |
| 2004/0252582 | A1 * | 12/2004 | Bucher | 366/273 |
| 2005/0002274 | A1 | 1/2005 | Terentiev | |
| 2005/0141342 | A1 * | 6/2005 | Hoobyar et al. | 366/273 |
| 2006/0092761 | A1 * | 5/2006 | Terentiev | 366/274 |
| 2007/0189115 | A1 * | 8/2007 | Yaniv et al. | 366/274 |
| 2007/0263484 | A1 * | 11/2007 | Terentiev | 366/273 |
| 2008/0008028 | A1 * | 1/2008 | Terentiev et al. | 366/273 |

FOREIGN PATENT DOCUMENTS

DE 42 32 934 A1 4/1994

(Continued)

*Primary Examiner* — Charles E Cooley
(74) *Attorney, Agent, or Firm* — Kusner & Jaffe (57) ABSTRACT

A contactlessly, inductively, or magnetically drivable agitator (1) for fluids, in particular for agitating sterile fluids which is equipped with a separating vessel (10) and an agitator head (2), which is supported thereon in an axially and radially movable fashion and is for supporting agitating elements (5). The novel agitator (1) includes structures for hydrodynamically generating a fluid film from the medium to be agitated and during operation, the fluid film is formed between at least one stationary part of the separating vessel (10) or a container bottom (11) and at least one part of the rotationally movable agitator head (2) that is equipped with the hydrodynamically acting structures. During operation, the fluid film eliminates essentially all of the pressure on the bearing, drastically reduces the wear, and as a result, practically no further abraded material gets into the fluids to be agitated. Such agitators permit maximum speeds of up to 3000 rpm. The agitators are suitable for installation in conventional metal receptacles, but it is preferable to use plastic nonreusable agitators in nonreusable containers.

5 Claims, 5 Drawing Sheets

FOREIGN PATENT DOCUMENTS

| | | |
|---|---|---|
| EP | 0 399 972 | 11/1990 |
| JP | 62277134 A * | 12/1987 |
| JP | 06190258 A * | 7/1994 |
| JP | 2007029870 A * | 2/2007 |

* cited by examiner

MAGNETIC AGITATOR

BACKGROUND OF THE INVENTION

1. Field of the Invention

The present invention relates to a magnetic agitator for fluids, in particular for agitating sterile fluids and a method for operating such an agitator.

2. Discussion of Related Art

It is hard to imagine process engineering, particularly in the biotech sector, the pharmaceutical industry, and the food industry, without mechanically agitated reactors. The problematic seal of the agitator shaft has led, for reasons of both sterility and biosafety, to a preference for floating agitator bearings in lieu of packing glands, lip seals, or sliding ring seals. Magnetically coupled agitator systems in which the separating vessel is part of a welding flange in the container wall, thus guaranteeing a hermetic separation of the inside of the container from the surrounding atmosphere, have been disclosed by the applicant and been successfully used in practice.

U.S. Pat. No. 4,993,841 and European Reference EP-A1-0,399,972 disclose magnetic agitators equipped with impellers embodied so that they can be driven in a contactless, inductive, or magnetic fashion. These impellers have a multitude of agitating blades extending radially outward from them that function as agitating tools or agitating elements. During operation, a vortical flow is generated in the container, with the impeller as the center point; the countervailing force of the impeller pulls upward and thus relieves the pressure on the bearing of the impeller. The suction in the direction of the impeller, however, is undesirable since it encourages the entrainment of gas into the agitated fluid and with some fluids, generates foam.

German Reference DE-A1-42 32 934 discloses a double impeller for bottom-mounted drive units designed to agitate sterile fluids, which has an improved mixing and agitating action. The agitating tools on the impeller head are embodied in the form of propellers. This generates an upwardly directed flow, thus preventing an undesirable entrainment of gas and generation of foam. The impeller head is provided with an opening at the bottom to accommodate the separating vessel in a central cavity. The step of providing at least one connecting line between the central cavity and the outer surface serves to continuously flush the cavity of the impeller with fluid, thus keeping the impeller clean.

On the underside of the impeller, additional flow-generating surfaces are provided, which are able to generate a downward or lateral flow directed counter to the flow generated by the propeller. These flow-generating surfaces are preferably embodied in the form of lateral wings or turbine-like lower end surfaces. The flow generated by the lower flow-generating surfaces partially compensates for the axial, downwardly directed forces of the propeller. This should reduce the pressure on the product-lubricated bearings, thus extending their expected service life. In order to actually achieve this effect, however, it is necessary to take into account the fact that:

i) a second flow is generated in the container that negatively influences the desired flow dynamics;
ii) the actual agitating elements are not easily interchangeable because depending on their weight and the flow generated, it is also necessary to adapt the countervailing force-generating bottom surfaces in a corresponding fashion;
iii) at a low fluid level in the container, only the lower surfaces extend down into the fluid and in the absence of the countervailing force from above, the agitator can be driven upward, away from the bearing pin;
iv) with tall and heavy agitating elements, for example in bottom agitation units equipped with a number of segmented agitator disks, the lower flow-generating surfaces are very large in area.

SUMMARY OF THE INVENTION

The object of the present invention, therefore, is to create an agitator that does not have the disadvantages of the known devices and to provide a method for operating this agitator.

In order to at least partially absorb the forces generated during agitation, the agitator head of the novel agitator includes means for hydrodynamically generating the fluid film composed of the medium to be agitated. The advantages lie in the simple design, the virtually wear-free operation, and the huge increase in the maximum possible speed of the agitator head.

BRIEF DESCRIPTION OF THE DRAWINGS

Various preferable embodiments of the agitator according to the present invention will be described below in conjunction with the drawings.

DESCRIPTION OF PREFERRED EMBODIMENTS

Figure 1A:
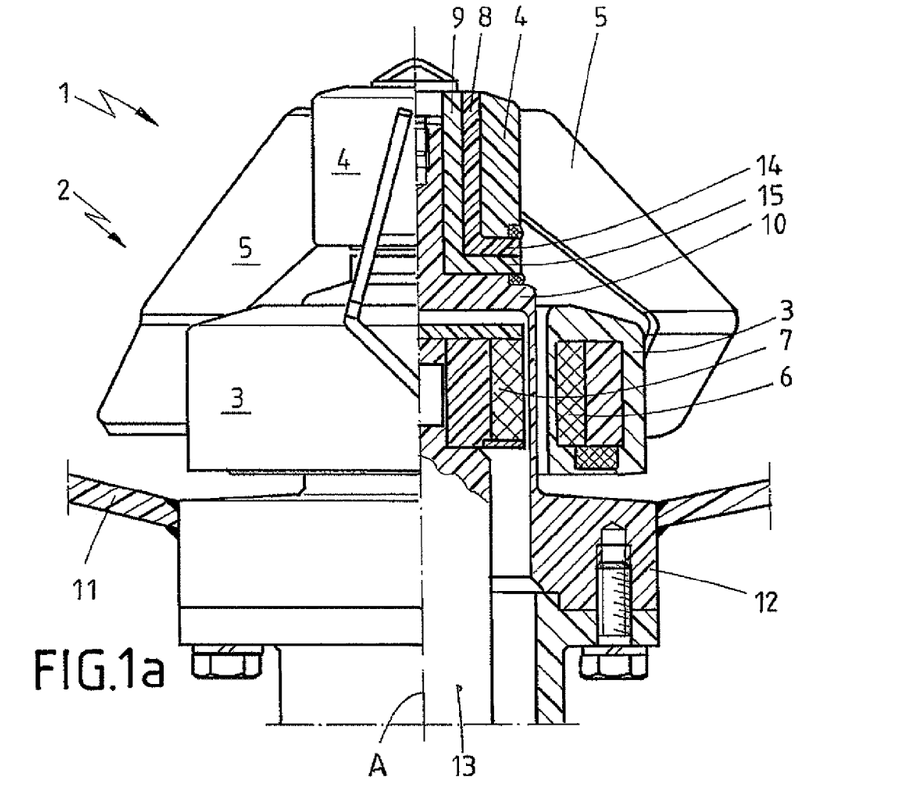
FIG. 1a is a partial longitudinal section through an agitator according to one preferred embodiment of the invention, when installed in a reactor vessel.
Figure 3A:
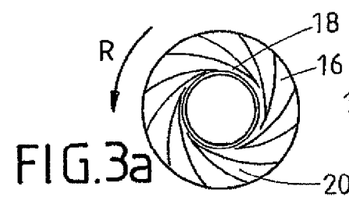
FIG. 3a is a bottom view of a rotor disk with V-grooves according to one preferred embodiment of this invention.
Figure 3B:
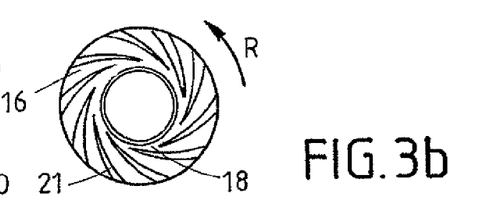
FIG. 3b is a bottom view of a rotor disk with spiral grooves according to one preferred embodiment of this invention.
Figure 4A:
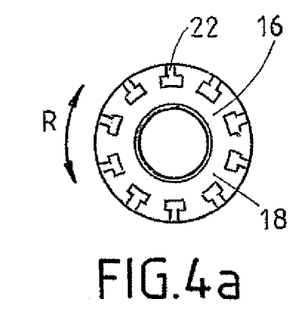
FIG. 4a is a bottom view of a rotor disk with T-grooves according to one preferred embodiment of this invention.
Figure 4B:
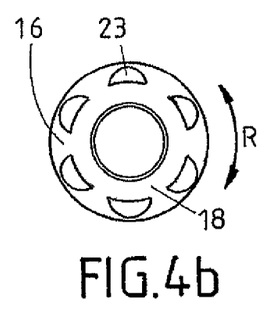
FIG. 4b is a bottom view of a rotor disk with U-grooves according to one preferred embodiment of this invention.
Figure 4C:
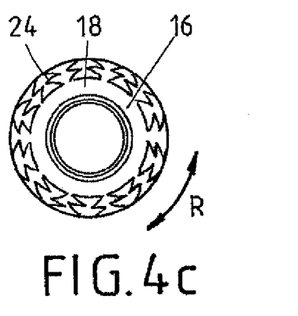
FIG. 4c is a bottom view of a rotor disk with Christmas tree-shaped grooves according to one preferred embodiment of this invention.

The agitator 1 according to one preferred embodiment of the present invention shown in FIG. 1a, is based on an impeller for breaking down temperature and concentration gradients in aqueous solutions, which has been successfully manufactured and marketed by the applicant. An agitator head 2 preferably has two rings 3 and 4 coaxial to each other, which are connected to each other via agitating elements 5. A magnetic outer rotor 6 is contained in a lower drive ring 3. In the agitator head according to FIG. 1, a bearing bushing 8 is inserted into an upper bearing ring 4. With the bearing bushing 8, the agitator head 2 is slid onto a protruding, stationary upper bearing pin 9 of a separating vessel 10. Preferably, the bearing is a ceramic slide bearing. The cylindrical, axially oriented portions of the bearing bushing 8 and bearing pin 9 cooperate in a known manner to assure the radial and axial movement of the agitator head. A novel feature of the bearing is that the bearing bushing 8 and bearing pin 9 are each provided with coaxial and coplanar disks 14, 15 at the bottom end, which preferably protrude vertically in relation to the rotation axis A of the bearing. The lower disk is embodied as a stationary counterpart disk 15 and the upper disk is embodied as a rotor disk 14 that can move in the radial and axial directions. An underside 16 of the rotor disk 14 is provided with hydrodynamically acting structures, preferably microgrooves. Some schematic examples of advantageous forms and arrangements of microgrooves 20-24 on the underside 16 of the rotor disk 14 are shown in FIGS. 3 and 4. Upon rotation in the direction R, the fluid to be agitated is scooped into and collected in the grooves 20-24. Above the transition speed, the fluid pressure between the rotor disk 14 and the counterpart disk 15 becomes high enough to lift the rotor disk 14 and along with it, the entire agitator head 2, in the axial direction, as shown in FIG. 1c. Generally, the height of the gap S thus generated between the rotor disk 14 and the counterpart disk 15 is automatically set as a function of the gap-opening forces and the gap-closing forces. The gap height mainly depends on the number and geometry of the grooves, the weight of the agitator and its attached agitating elements, the speed of the agitation, and the medium to be agitated. The exemplary embodiment shown in FIG. 7 lifts up e.g. 0.05 to 1 mm, depending on the speed.

Figure 1B:
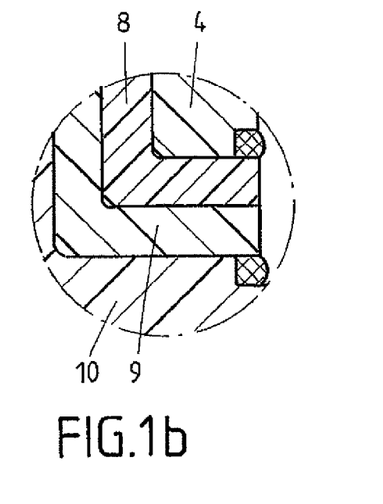
FIG. 1b is an enlarged detail in the region of the bearing disks according to FIG. 1a when at rest.
Figure 1C:
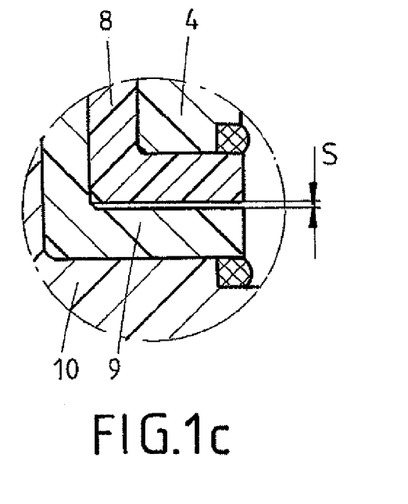
FIG. 1c shows the enlarged detail from FIG. 1b during operation.

According to a preferred embodiment of the invention shown in FIGS. 1b and 1c, the grooves extend over the entire underside 16 of the rotor disk so that during operation, fluid is fed into the space between the bearing bushing 8 and the bearing pin 9, thus adding additional stability to this axial bearing.

Figure 7A:
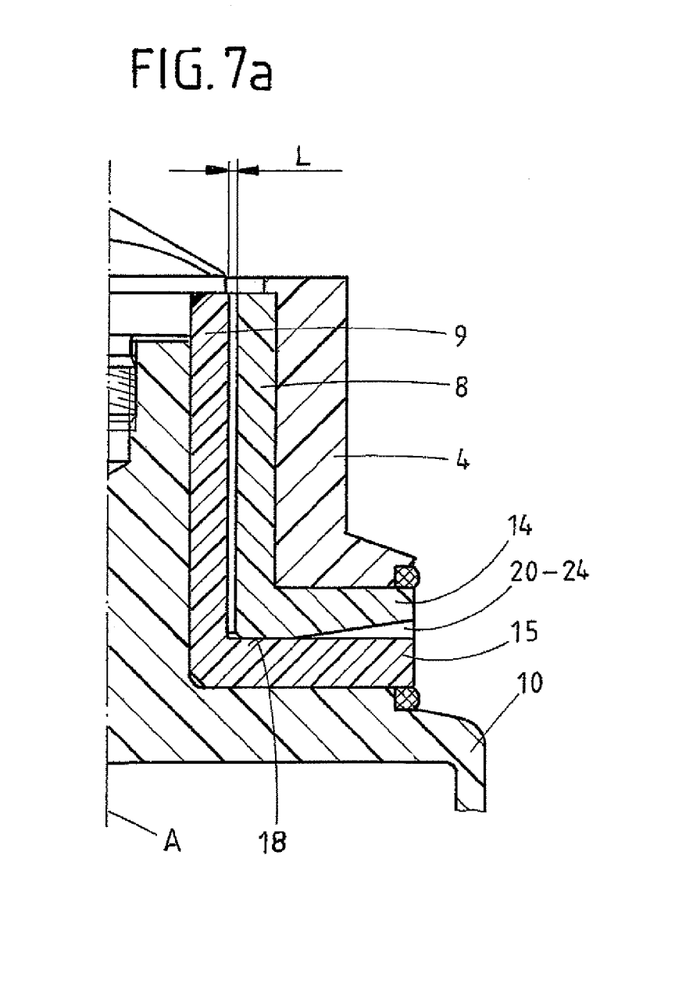
FIG. 7a shows a partial longitudinal section through a bearing and the means for relieving pressure on the bearing according to one preferred embodiment of this invention, when at rest.
Figure 7B:
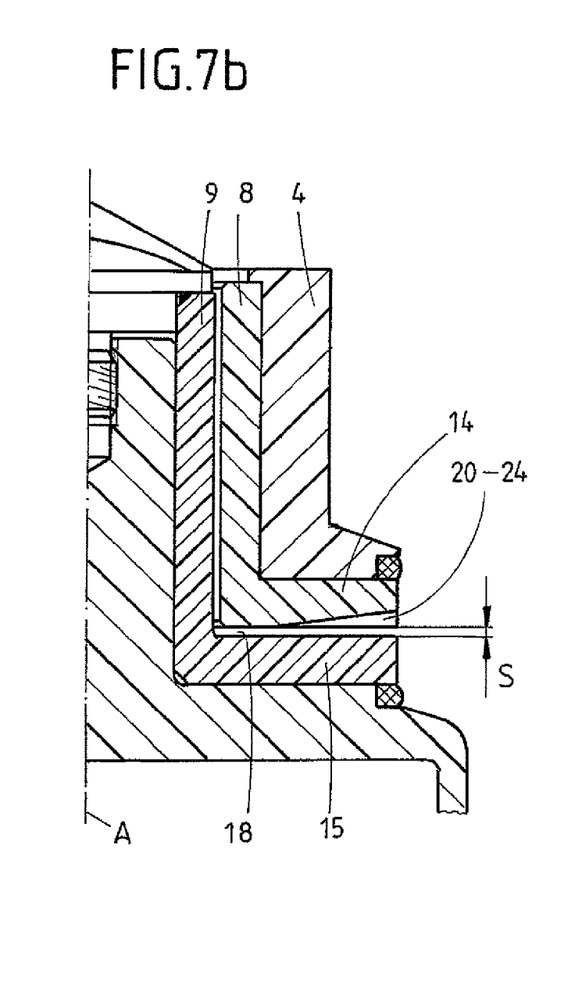
FIG. 7b shows the view from FIG. 7a, when the agitator is running.

FIGS. 7a and 7b show another advantageous embodiment form of the present invention in which, by contrast with the embodiment according to FIG. 1, the grooves do not extend over the entire surface of the underside 16. In the center, a circumferential bridge piece 18 remains, which is supported on the top surface 17 of the counterpart disk when at rest. In the embodiment shown in FIGS. 7a and 7b, the height of the grooves decrease toward the inside. The inclination angle or tilt T in the example shown is approximately 7°; the embodiment and arrangement of the grooves is shown in simplified fashion. The tilt preferably lies in a range from approximately 0.1 to approximately 100 and the inner bridge piece 18 is between approximately 1 and approximately 10 mm wide.

In order to take into account the expansion of the materials at different temperatures, the respective materials in the bearing pair are selected so as to produce a play L of approximately 0.02 to approximately 0.5 mm, depending on the diameter and the bush length.

In another advantageous embodiment form of the present invention, the means for hydrodynamically generating a fluid film are not embodied in the form of microgrooves, but instead, the underside of the rotor disk is embodied as a wavy face of the kind known from the gas-lubricated slide ring seals made by the Flowserve company in Irving, Tex., U.S.A.

In lieu of the cylindrical slide bearing in relation to which the rotor disk and counterpart disks are oriented vertically, it is also possible, particularly for smaller and lighter-weight agitator heads, to use a bearing the shape of a truncated cone in which the axially and radially acting forces are generated and absorbed by only two surfaces. The means for hydrodynamically generating the fluid film do not differ substantially from the ones described above.

Below the transition speed, the fluid film and therefore the gap S break down and the rotor disk 14 slides back down so that its underside 16 rests directly against a top surface 17 of the counterpart disk 15, thereby increasing the friction. In practice, this is only relevant when starting and stopping the agitator, otherwise an operating speed above the transition speed is selected. The transition speed also depends on the medium to be agitated; high viscosity fluids decrease the transition speed and low viscosity fluids increase it.

Figure 2:
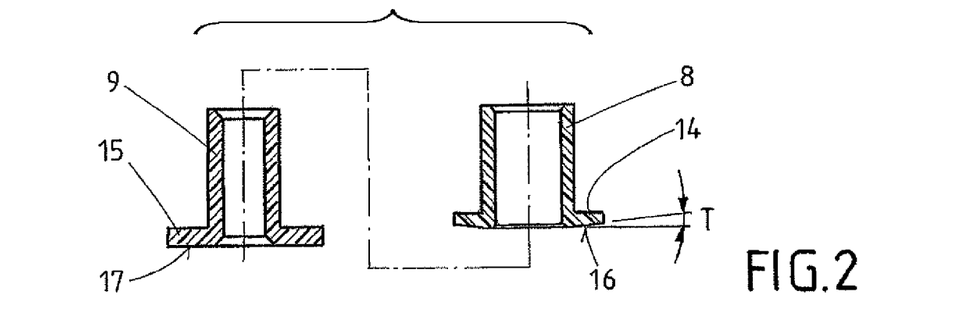
FIG. 2 is a longitudinally sectional exploded view of the bearing and the means for relieving pressure on the bearing according to FIG. 1.
Figure 5:
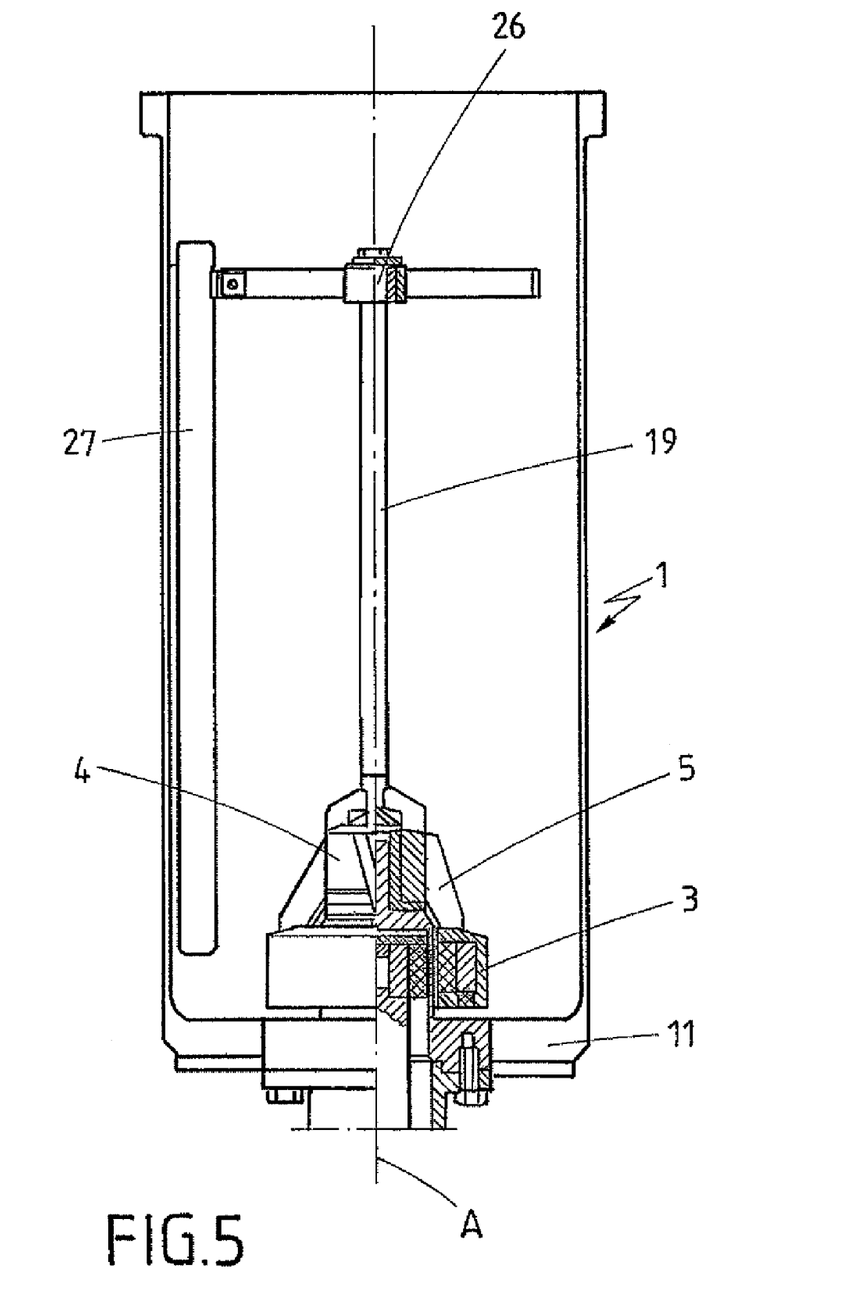
FIG. 5 shows a partial longitudinal section through a reactor vessel for bacteria cultures, having an agitator equipped with a bottom-mounted drive unit and an additional upper bearing according to one preferred embodiment of this invention; the drawing depicts a lateral baffle, but omits the agitating elements that can be attached to the shaft.

FIG. 2 is a longitudinally sectional exploded view of the bearing 8, 9 and the means 14, 15 for relieving pressure on the bearing and for absorbing the axial forces. In the example shown, the bearing bushing 8 and rotor disk 14 and the corresponding bearing pin 9 and counterpart disk 15, respectively, are embodied as integrally joined to each other. Since, according to this exemplary embodiment, the rotor disk 14 and the counterpart disk 15 are manufactured out of the same high quality materials as the bearing, the friction when starting and stopping the agitator does not pose a problem. As soon as the speed of the agitator is sufficient to hydrodynamically generate the fluid film from the medium to be agitated, then this film separates the two surfaces 16, 17 in opposition to the weight of the agitator head 2 and in opposition to the downwardly directed axial forces generated during agitation. Depending on the field in which it is used, an agitator head of the kind depicted in FIG. 5 has a number of agitating elements situated one above another on the shaft 19 and can weigh up to 50 kg. In order to avoid a lateral tipping it has up until now been necessary to stabilize these agitators by means of an upper bearing 26. The upper bearing, however, does not solve the weight problem because the agitator head continues to rest with its full weight against the separating vessel. The present invention makes it possible to relieve the pressure on the bearing in a particularly advantageous fashion and to minimize the undesirable wear.

Preferred materials for manufacturing the bearing bushing, rotor disk, bearing pin, and counterpart disk include silicon carbide (SiC), zirconium oxide ($ZrO_2$), aluminum oxide ($Al_2O_3$), polyether ether ketone (PEEK), polyvinylidene fluoride (PVDF), Teflon® (heavy-duty plastics perfluoroalkoxy copolymer (PFA) and polytetrafluoroethylene (PTFE)), Teflon® with glass or carbon fibers, carbon, or graphite.

Preferably, the rotor disk and counterpart disk, and the bearing bushing and bearing pin, respectively, are not made of the same material in order to minimize the corrosion tendency. A preferred material combination is SiC and $ZrO_2$.

In the exemplary embodiments according to the drawings, the bearing bushing/rotor disk and bearing pin/counterpart disk, respectively, are integrally joined to each other since the above-mentioned products are suitable for use in sterile engineering applications. In this field, reusable components that come into contact with sterile solutions can be simply cleaned with extreme care, which is one advantage of the integral design of the bearing bushing/rotor disk and the bearing pin/counterpart disk. Since the seal between the bearing bushing and rotor disk and between the bearing pin and counterpart disk is on the one hand, expensive, and on the other hand, is often rejected by users for sterile engineering applications, the integral construction is favorable for commercial reasons. For applications that do not require sterile procedures, is also possible for the bearing bushing/rotor disk and the bearing pin/counterpart disk to be embodied in two-part construction, thus permitting more material combinations and allowing production costs to be reduced through the use of a conventional seal.

Whereas the hydrodynamically acting V-grooves 20 and spiral grooves 21 from FIGS. 3*a* and 3*b* only generate the desired pressure in one rotation direction R, the T-grooves 22, U-grooves 23, and Christmas tree-shaped grooves 24 permit operation in both rotation directions. This bi-directional operability, however, takes a toll on efficacy since they generate less hydrodynamic pressure.

Figure 6:
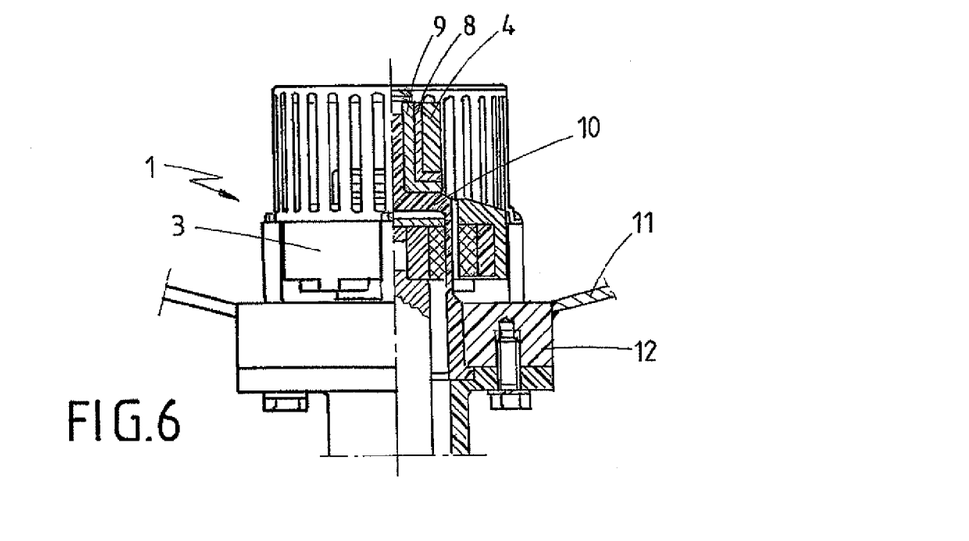
FIG. 6 shows a partial longitudinal section through a rotor/stator agitation unit according to one preferred embodiment of this invention.

Because the load on the bearing is decisively reduced, it is possible to operate the agitators according to the present invention at significantly higher speeds than was possible with the known magnetic agitators. It is therefore possible in a novel manner to achieve rotor/stator agitation units that are operated at speeds of up to 3000 rpm. FIG. 6 shows such an agitation unit used for deflocculation, which is able to achieve the high peripheral speed desired.

FIG. 1 merely indicates the container bottom 11 into which a basal flange 12 of the separating vessel 10 is welded. The example shown is a bottom-magnet agitation unit of the kind used, for example, in bioreactors. Of the drive unit, the drawing shows only the drive magnet, i.e. an inner rotor 7, and the upper part of a drive shaft 13 that supports the inner rotor 7. The outer rotor is preferably encapsulated in the drive ring and does not come into contact with the fluids to be agitated. According to one preferred embodiment of the present invention that is not shown in the drawings, the means for hydrodynamically generating the fluid film include a region of the top surface of the flange embodied in the form of a counterpart disk and a region of the underside of the drive ring embodied in the form of a rotor disk. When at rest, the part of the drive ring equipped with the hydrodynamically acting means rests against the region of the flange embodied in the form of the counterpart disk. When the agitator head rotates, a fluid film builds up once again between the rotor disk and counterpart disk, thus lifting up the agitator head. The spatial separation between the bearing and the means for hydrodynamically generating the fluid film results in a significantly increased design freedom. The effective surfaces of the rotor disk and counterpart disk and their diameter can be sharply increased so that even large and heavy agitating elements can be easily lifted and stabilized during operation. The actual bearing of such an agitator must have a corresponding axial play, which permits complete omission of the radial parts 14, 15 shown in the drawings. In other advantageous embodiment forms, the region of the flange or container bottom referred to as the counterpart disk is preferably interrupted in the radial direction in order to assure good circulation of the medium to be agitated. These interruptions permit simpler groove shapes to be used since the fluid no longer has to be fed from the periphery to the center but can instead be scooped into the grooves in the region of the interruptions, over the entire width of the rotor disk.

In other preferred embodiment forms, the agitators according to the present invention are optimized for installation in nonreusable containers. In this case, the agitator and separating vessel are preferably made of plastic so that they can easily be discarded along with the nonreusable container after a single use. Such nonreusable containers are used to reduce costs for the apparatus parts per se, such as reactors, fermenters, mixing containers, and transport containers, and to simultaneously avoid time-consuming and cost-intensive cleaning. Such nonreusable containers, which can be easily disposed of after use, are known, for example, from the company Newport Bio Systems Inc., Anderson, Calif., USA and are marketed with the slogan "Biobags for Biotech—a cleanroom in a bag". These flexible nonreusable containers or biobags are manufactured, for example, from class VI polyethylene, with volumes of between 0.5 and 2500 liter. The design of the flexible container wall differs as a function of the application field (storage, transport, production), with multi-layer coextruded films (LLDPE, EVOH, LLDPE/EVA, nylon (PVdC-coated) usually being selected.

Figure 8:
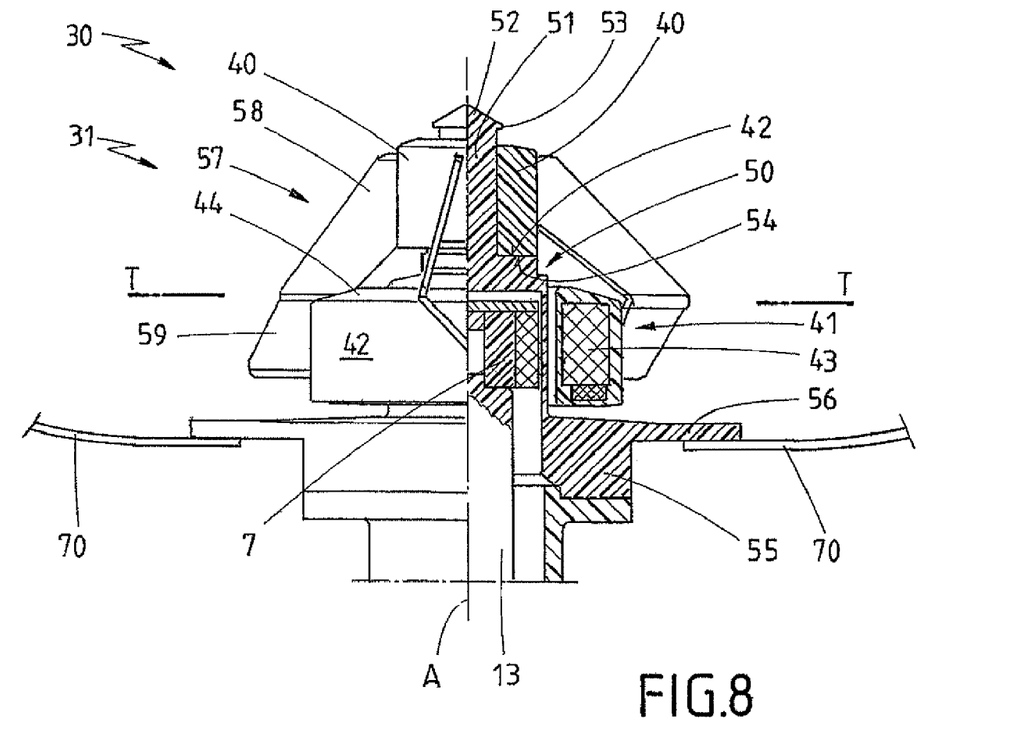
FIG. 8 shows a partial longitudinal section through an agitator according to one preferred embodiment of this invention, when installed in a nonreusable container.

FIG. 8 shows an exemplary embodiment of an agitator 30 that is built into such a nonreusable container 70. A separating vessel 50 made of plastic includes a basal flange 55, which is provided for connecting to a lower container wall 70 equipped with a radial flange 56. The container wall 70 is preferably glued or welded to the flange 56 or is flange-mounted or clamped through suitable means. In other exemplary embodiment forms not shown in the drawings, the container wall 70 can also be fastened directly to the basal flange 55 or to the separating vessel 50; a sealed connection must be assured in all cases.

In order to accommodate the drive shaft 13 with the inner rotor 7, the separating vessel 50 in turn has a corresponding receiving space so that the inner or rotor 7 and a corresponding outer rotor 43 can be brought into a coplanar position in order to be able to couple the force from the inner rotor radially into the outer rotor.

In the exemplary embodiment shown, the outer rotor 6 is completely encapsulated in the plastic drive ring 41 and in lieu of the above-described separate bearing bushing and bearing ring, correspondingly embodied regions of a bearing ring 40 cooperate with an axial bearing pin 51 of the separating vessel. With regard to the features that generate the lift-off effect, nothing further need be explained since those skilled in the art can apply above-disclosed technical teaching to the plastic versions for nonreusable containers. Preferably, the agitator heads 31 and separating vessels 50 can be constructed so as to allow them to be produced using the injection molding technique. According to a preferred embodiment form, a mold parting line can be routed through the agitator head 31 so that it is divided into two parts that can be easily demolded from the injection mold. Such a mold parting line E is shown in FIG. 8 that is positioned so that the drive ring 41 is divided into a lower part 42, which contains a receiving space for the outer rotor 43, and an upper cover 44. The cover 44 is preferably formed onto at least one of the agitating elements 57 so that only two plastic components need to be manipulated during assembly. After the injection-molding, the outer rotor 43, which can include one or more individual magnets of corresponding polarity or polarities, can be inserted into the receiving space, thus eliminating the need for an extrusion coating of the magnet(s), which is complex from a technical manufacturing standpoint. After the outer rotor 43 has been inserted into the lower part 42 of the drive ring 41, the upper part 44 is placed onto it and the two parts are fastened to each other.

In another preferred embodiment form, the cover 44 is not connected to the agitating elements but is instead connected to the bottom part 42 by means of a hinge so that after insertion of the magnets, the assembly can be completed merely by pivoting the hinge. Once closed, the cover and bottom part can be joined to each other, for example, by being welded, glued, clamped through suitable means, flange-mounted, or screw-connected. The agitating elements 57 of the exemplary embodiment in FIG. 8 cannot be injection molded without undercuts and therefore, with this type of production, preferably also have an upper part 58 and a lower part 59 that can be joined to each other, preferably approximately in the region of the mold parting line, for example by means of male and female parts of a plug connection not shown in the drawing. In order to simplify the injection molding production, the agitator head 31 can also be embodied in a significantly simpler fashion. The agitating elements 57 can, for example, directly engage the cover 44, which transmits the torque from the bottom part and outer rotor 43 to the agitating elements.

For reasons of sterility, it is desirable for the interior of the nonreusable container to be no longer accessible after manufacturing. Ideally, once manufactured, the vessels are stored and/or transported to the end user in a closed, collapsed form that saves space. In order to prevent the agitator head 31 from being able to detach from the separating vessel 50 during transport and use, it is preferably slid onto the bearing pin 51 in captive fashion, as shown in FIG. 8. The agitator head 31 is supported with the desired amount of play, in a radially and axially movable fashion. When at rest, the agitator head 31, with an underside 42 of the bearing ring 40 that corresponds to the underside of the rotor disk 14, rests on a counterpart surface 54 of the separating vessel 50 that corresponds to the top surface of the counterpart disk. Once the transition speed has been reached, the agitator head 31 lifts away from the separating vessel once again, the axial mobility toward the top being limited by a knob 52 provided at the upper end of the axle 51. A radial, circumferential bead 53 prevents the agitator head 31 from falling off the bearing pin 51 during transport or operation. The diameter of the knob 52 in the region of the bead 53 is preferably just enough larger than the inner diameter of the central opening in the bearing ring 40 to reliably secure the agitator head 31 to the axle 51, but also to permit it to be pushed over the knob 52 onto the axle or bearing pin 51 from above during production.

According to one preferred embodiment forms not shown in the drawings, the bearing ring 40 and axle 51 are not embodied as integrally joined to each other, but comprise a separate bearing bushing and a separate bearing pin. In a manner analogous to the agitators described at the beginning, the hydrodynamically acting means in the nonreusable agitators 30 can be made of metal, which brings enormous advantages for the manufacturing costs in the preferred injection-molding production.

The plastic components of the agitator 30 for nonreusable containers are preferably made of HDPE since this material works well in injection-molding and can be welded to the container wall 70.

The motor types that can be used in the drive unit for the agitators according to the present invention are known from the prior art: direct-current drive units, alternating current drive units, embodied as needed in anti-explosive designs (ATEX), speed-controlled motors with external or integrated frequency converters, and pneumatic drive units, respectively combined with a suitable transmission variant. An optional quick release permits a simple disassembly of the motor in the event that the container must be sterilized in an autoclave. In an advantageous embodiment form, the drive unit includes a lowering device for the drive shaft with the driving magnets 7. Particularly in high-torque agitation units, this facilitates the safe, easy removal of the agitator head 2, even in the presence of powerful magnetic fields. In the agitators according to the present invention, the transmittable torques lie in the range from 30 Ncm to 300 Nm.

Swiss Patent Reference 01303/05, the priority document corresponding to this invention, and its teachings are incorporated, by reference, into this specification.

What is claimed is:

1. A contactlessly, inductively, or magnetically drivable agitator (1, 30) for fluids, in particular for agitating sterile fluids, comprising:

a separating vessel (10, 50) and an agitator head (2, 31), which is supported thereon in an axially and radially movable fashion and is for supporting agitating elements (5, 57), wherein the agitator (1, 30) includes means for hydrodynamically generating a fluid film from the fluid to be agitated during operation, the fluid film is formed between a stationary disk (15) at a bottom end of a stationary bearing pin (9) and a rotor disk (14) movable in an axial and radial direction and provided at a bottom end of movable bearing bushing (8), with stationary disk (15) and rotor disk (14) being oriented perpendicular in relation to a rotation axis A of the agitator head (2) and in a coaxial and coplanar fashion, wherein the bearing bushing (8) is inserted into an upper bearing ring (4) of the agitator head (2) while the agitator head (2) is slid with said bearing bushing (8) onto said stationary bearing pin (9) and wherein the stationary disk (15) extends outwardly from the stationary bearing pin (9) and the rotor disk (14) extends outwardly from the bearing bushing (8), wherein an underside (16) of the rotor disk (14), oriented toward the stationary disk (15), is provided with hydrodynamically acting structures, wherein the hydrodynamically acting structures comprise at least one of microgrooves (20-24) and a wavy face, wherein the microgrooves for operation in one rotation direction are selected from the group including V-grooves and spiral grooves and the grooves for operation in both rotation directions are selected from the group including T-grooves, U-grooves, and Christmas tree-shaped grooves.

2. The agitator (1) according to claim 1 wherein the bearing bushing (8) and the rotor disk (14) and the bearing pin (9) and the stationary disk (15), respectively, are manufactured so as to be integrally joined to each other.

3. A contactlessly, inductively, or magnetically drivable agitator (1, 30) for fluids, in particular for agitating sterile fluids, comprising:

a separating vessel (10, 50) and an agitator head (2, 31), which is supported thereon in an axially and radially movable fashion and is for supporting agitating elements (5, 57), wherein the agitator (1, 30) includes means for hydrodynamically generating a fluid film from the fluid to be agitated during operation, the fluid film is formed between a stationary disk (15) at a bottom end of a stationary bearing pin (9) and a rotor disk (14) movable in an axial and radial direction and provided at a bottom end of movable bearing bushing (8), with stationary disk (15) and rotor disk (14) being oriented perpendicular in relation to a rotation axis A of the agitator head (2) and in a coaxial and coplanar fashion, wherein the bearing bushing (8) is inserted into an upper bearing ring (4) of the agitator head (2) while the agitator head (2) is slid with said bearing bushing (8) onto said stationary bearing pin (9) and wherein the stationary disk (15) extends outwardly from the stationary bearing pin (9) and the rotor disk (14) extends outwardly from the bearing bushing (8), wherein an underside (16) of the rotor disk (14), oriented toward the stationary disk (15), is provided with hydrodynamically acting structures, wherein the hydrodynamically acting structures comprise at least one of microgrooves (20-24) and a wavy face, wherein a height of the microgrooves decreases toward an inside of the rotor disk (14), at an inclination angle of 5 to 10°.

4. The agitator (1) according to claim 3 wherein the bearing bushing (8) and the rotor disk (14) and the bearing pin (9) and the stationary disk (15), respectively, are manufactured so as to be integrally joined to each other.

5. A contactless, inductively or magnetically drivable agitator (1, 30) for fluids, in particular for agitating sterile fluids, comprising:

a separating vessel (10, 50) and an agitator head (2, 31), which is supported thereon in an axially and radially movable fashion and is for supporting agitating elements (5, 57), wherein the agitator (1, 30) includes means for hydrodynamically generating a fluid film from the fluid to be agitated during operation, the fluid film is formed between a stationary disk (15) at a bottom end of a stationary bearing pin (9) and a rotor disk (14) movable in an axial and radial direction and provided at a bottom end of a movable bearing bushing (8), with stationary disk (15) and rotor disk (14) being oriented perpendicular in relation to a rotation axis A of the agitator head (2) and in a coaxial and coplanar fashion, wherein the bearing bushing (8) is inserted into an upper bearing ring (4) of the agitator head (2) while the agitator head (2) is slid with said bearing bushing (8) onto said stationary bearing pin (9), wherein an underside (16) of the rotor disk (14), oriented towards the stationary disk (15), is provided with hydrodynamically acting structures, namely microgrooves (20-24) having a height which decreases toward an inside of the rotor disk (14) at an inclination angle of between 5 and 10 degrees and wherein the stationary disk (15) extends outwardly from the stationary bearing pin (9) and the rotor disk (14) extends outwardly from the bearing bushing (8).

* * * * *